(12) United States Patent
Castaneda

(10) Patent No.: US 9,004,281 B1
(45) Date of Patent: Apr. 14, 2015

(54) REUSABLE PROTECTIVE ENCLOSURE SYSTEM FOR AN OPEN-ENDED TUBULAR MEMBER

(71) Applicant: Aldo Francisco Castaneda, Mill Valley, CA (US)

(72) Inventor: Aldo Francisco Castaneda, Mill Valley, CA (US)

( * ) Notice: Subject to any disclaimer, the term of this patent is extended or adjusted under 35 U.S.C. 154(b) by 0 days.

(21) Appl. No.: 14/164,097

(22) Filed: Jan. 24, 2014

Related U.S. Application Data

(63) Continuation-in-part of application No. 14/126,287, filed as application No. PCT/US2012/049007 on Jul. 31, 2012, which is a continuation of application No. 13/217,997, filed on Aug. 25, 2011, now Pat. No. 8,251,221.

(51) Int. Cl.
  *B65D 81/02* (2006.01)
  *B65D 23/08* (2006.01)

(52) U.S. Cl.
  CPC .................. *B65D 23/0885* (2013.01)

(58) Field of Classification Search
  CPC ............ B65D 23/0885; B65D 81/022; B65D 81/113; B65D 85/20
  USPC .................. 206/204, 446, 521, 523, 591, 592; 211/74; 215/11.6, 12.1, 12.2
  See application file for complete search history.

(56) References Cited

U.S. PATENT DOCUMENTS

| | | | |
|---|---|---|---|
| 1,063,351 A | 6/1913 | Hyatt | |
| 2,480,247 A | 8/1949 | Jamison | |
| 2,838,194 A | 6/1958 | Piker | |
| 3,027,286 A * | 3/1962 | Kurhan | 206/523 |
| 3,120,319 A * | 2/1964 | Buddrus | 215/12.2 |
| 3,309,893 A | 3/1967 | Heffler et al. | |
| 3,531,644 A | 9/1970 | Koster | |
| 3,604,584 A | 9/1971 | Shank, Jr. | |
| 3,621,994 A | 11/1971 | Brown | |
| 3,982,716 A | 9/1976 | Trees | |
| 4,098,577 A | 7/1978 | Halpern | |
| 4,114,759 A | 9/1978 | Maloney, Jr. | |
| 4,240,547 A | 12/1980 | Taylor | |
| 4,300,612 A | 11/1981 | Schroeder, Jr. et al. | |
| 4,560,069 A * | 12/1985 | Simon | 206/591 |
| 4,681,239 A * | 7/1987 | Manns et al. | 215/12.1 |
| 4,746,017 A | 5/1988 | Howard et al. | |
| 4,813,541 A | 3/1989 | Velasco et al. | |
| 4,915,255 A | 4/1990 | Curtis | |

(Continued)

FOREIGN PATENT DOCUMENTS

| | | |
|---|---|---|
| JP | 2008081137 A | 4/2008 |
| KR | 2020100006962 | 7/2010 |

*Primary Examiner* — Bryon Gehman
(74) *Attorney, Agent, or Firm* — Patent Law Offices Michael E. Woods; Michael E. Woods

(57) ABSTRACT

An improved reusable protective enclosure system, comprising a protective housing and cap member for jars, bottles and similar receptacles of glass or other fragile material. Its main object is the construction of a housing that renders a vial or jar contained therein resistant from breakage if the housing is allowed to fall or suffers a sudden shock. Another object of the reusable protective enclosure system is the construction of an airtight enclosure, which is simple and inexpensive to manufacture. Other advantages of the invention are that the inner receptacle be it made of glass or other fragile material, can be readily and repeatedly accessed, removed for sterilization or recycling and replaced for continued use.

4 Claims, 13 Drawing Sheets

(56) References Cited

U.S. PATENT DOCUMENTS

| | | |
|---|---|---|
| 4,942,966 A | 7/1990 | Kemp |
| 4,955,480 A | 9/1990 | Sexton |
| 5,024,865 A | 6/1991 | Insley |
| 5,029,699 A | 7/1991 | Insley et al. |
| 5,160,021 A | 11/1992 | Sibley et al. |
| 5,184,721 A | 2/1993 | Wengyn et al. |
| 5,186,344 A | 2/1993 | Cook |
| 5,219,504 A | 6/1993 | Insley |
| 5,303,822 A | 4/1994 | Wengyn et al. |
| 5,375,716 A | 12/1994 | Rubin et al. |
| 5,695,090 A | 12/1997 | Burdick |
| 5,699,922 A | 12/1997 | Harding |
| 5,860,550 A | 1/1999 | Miller et al. |
| 5,975,308 A | 11/1999 | Horng et al. |
| 6,112,579 A | 9/2000 | Tryba |
| 6,345,719 B1 | 2/2002 | Jaycox |
| 6,793,076 B1 | 9/2004 | Luo et al. |
| 8,163,255 B1 | 4/2012 | Rudolph |
| 8,251,221 B1 | 8/2012 | Castaneda |

* cited by examiner

REUSABLE PROTECTIVE ENCLOSURE SYSTEM FOR AN OPEN-ENDED TUBULAR MEMBER

CROSS REFERENCE TO RELATED APPLICATIONS

This application is a Continuation-In-Part of National Stage Application (U.S. application Ser. No. 14/126,287 filed 13 Dec. 2013) of International Application PCT/US2012/049007 having an international filing date of 31 Jul. 2012 which was a continuation of U.S. patent application Ser. No. 13/217,997, filed 25 Aug. 2011 (now U.S. Pat. No. 8,251,221), the entireties of the contents thereof expressly incorporated by reference thereto for all purposes.

BACKGROUND OF THE INVENTION

This embodiment pertains to the general field of glass-lined enclosures and more particularly, but not exclusively, to a recyclable, reusable protective housing, which seals and protects an open-ended tubular member such as a glass vial or jar and the like.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

One of the most effective means of storing and transporting substances is the use of glass-lined containers. Recently, though, plastic has become the preferred material for many products that, in the past, were exclusively manufactured from glass, such as medicine vials, jars and bottles. The reasons for the replacement of glass by plastic are primarily that plastic weighs less and is less expensive and is easier to produce. Along with additional safety factors, such as less chance of breakage, it is no surprise that plastic has almost completely replaced glass containers.

The main industries that continue to rely upon glass for containers are the medical and natural remedy industries. While plastic jars have replaced glass jars and bottles in some applications, there is still a need for glass. This is particularly true for the storage and transport of certain medicines and natural remedies, extracts, oils and tinctures, such as those that are susceptible to contamination or may leach into plastic containers.

A major problem exists in that plastic containers have been shown to cause contamination of the contents therein. An increasingly large population of people now prefer glass containers due to concerns over the risk of leaching from bisphenol A and phthalates, two additives used in plastic containers. Plastic containers also allow certain, usually organic compounds, medications to be absorbed into the plastic surface of the container itself, which may reduce potency of medications stored therein. Such contamination of a plastic containers also prevents the possibility of reuse or recycling of the container.

The only solution to many of these problems has been to continue storing and transporting medications and natural remedies in glass containers. Unfortunately, a glass container is considered undesirable due to the risk that it may break.

If there were some way to continue using glass containers for medications and natural remedies, with all of the safety characteristics of plastic, for the above reasons glass-based containers would be preferred in many situations. Such a glass container would offer the benefits of modern plastic containers such as an airtight seal, without risk of over or under-tightening; easy opening even for the elderly and disabled; with essentially effortless, resealing; and the container would be entirely re-usable and recyclable and free from the risk of chemical leaching. Such a container would also be shockproof to reduce the risk of breakage, while being aesthetically pleasing as well as simple and reliable yet inexpensive to fabricate.

The following U.S. patents are generally related to features disclosed herein:

| U.S. Pat. No. | Issue Date | Patentee |
| --- | --- | --- |
| 5,695,090 | Dec. 9, 1997 | Burdick |
| 1,063,351 | Jun. 3, 1913 | Hyatt |
| 6,793,076 | Sep. 21, 2004 | Luo et al. |
| 5,699,922 | Dec. 23, 1997 | Harding |
| 4,746,017 | May 24, 1988 | Howard, et al |
| 4,300,612 | Nov. 17, 1981 | Schroeder, Jr. et al. |
| 3,982,716 | Sep. 28, 1976 | Trees |
| 3,604,584 | Sep. 14, 1971 | Shank, Jr. |

The U.S. Pat. No. 5,695,090 discloses a removable insulating container, which grips a bottle such that the container is held snugly in place. The container uses a separate lower sleeve and an upper cap, which are mounted on a medicine bottle to substantially encase the medicine bottle. The container is fabricated from a multi-layer flexible material, which has an impact resistant outer layer and an inner layer, which forms an internal channel that grips the side of the medicine bottle. The proximal end of the lower sleeve extends past the bottom of the bottle to prevent it from impacting a surface should it be dropped.

The U.S. Pat. No. 1,063,351 relates to protective casings or enclosures for bottles and similar receptacles of glass or other fragile material and has for its main object the construction of a casing in such a way as to make a bottle contained therein immune from breakage if the casing is allowed to fall. Another object of the invention is the construction of a casing, which is both simple and inexpensive to manufacture. A further object of the invention is the construction of a casing in which is formed grooves or pockets, which may be used for the carrying of any desired articles such as thermometers etc.

The U.S. Pat. No. 6,793,076 discloses a glass bottle protective housing designed to protect a glass bottle in the event the bottle is subjected to an impact shock. The enclosure is provided with a leak-proof seal and is particularly adapted for protecting glass bottles containing toxic injectable medication. The enclosure, which is preferably made from a transparent plastic, consists of a lower bottle container which includes a base and a plurality of shock absorbers, which are located to allow a bottle label to be clearly visible, on the base is located at least one sensor cavity into which is inserted an enclosure leakage sensor consisting of either a water soluble sensor or an electronic sensor. Both of which provide an indication if a bottle leakage occurs. To complete the enclosure the container includes a threaded bottle container cap, which includes a plurality of cap shock absorbers.

The U.S. Pat. No. 5,699,922 discloses a container closure system including a plurality of equally circumferentially distributed pins extending outwardly from a tubular neck of the container near the opening. A detachable cap consisting of nested inner and outer cap members. The inner cap member is dimensioned to receive the container neck and includes a plurality of sidewall openings for receiving the pings. The outer cap member has a plurality of licking wedges disposed on its inner surface. The inner and outer cap members are assembled so as to permit mutual rotation. Thus, when the cap is emplaced over the open end of the container, the pins are received in the openings to thereby inhibit mutual rotation between the inner cap member and the container, thus sealing the inner glass member and providing access to its contents via a safety cap easy for adults and young adults to open but difficult or impossible for children to open.

The U.S. Pat. No. 4,746,017 discloses a protective safety container for encasing toxic drug filled glass vials is disclosed. The container includes a molded plastic body that is shaped to conform to the shape of a vial to be protected. A plurality of spaced longitudinal ribs are formed on the inner surface of the container body that act to engage the vial and hold it firmly in position, and also form a cushioning air space between the vial and the container. A molded plastic annular base is adapted to be snap fitted into the body such that the vial cannot be easily removed once it is secured within the container. Disposed in the top of the container is a small aperture having a frangible disk disposed therein. The disk may be removed so that a hypodermic needle may be inserted into a stopper in the vial to withdraw the vial's contents. The aperture is too small, however, to permit removal of the stopper itself. All of these features combine to provide a protective container for a glass vial.

The U.S. Pat. No. 4,300,612 discloses a solvent and shatter resistant protector for glass bottles containing hazardous materials. The protector is comprised of opaque or transparent polymeric material and conforms substantially to the shape of the container that is protected. The container protector is made up of top and bottom portions, each having respective cooperating means, such as a special threading arrangement, for separable engagement, which enables engagement to be maintained even in the event of shocks that are sufficient to damage the protected glass container.

The U.S. Pat. No. 3,982,716 discloses a holder for temporarily supporting a bottle containing hypodermically injected medication. The holder is magnetically attached to a supporting surface, and securely supports the bottle so that both hands of the user are free to manipulate a syringe to withdraw the proper dosage from the bottle.

The U.S. Pat. No. 3,604,584 discloses a method for protecting glass articles, such as jars and drinks bottles from abrasion by heat shrinking a thermoplastic material around a portion of the glass article.

For background purposes and as indicative of the art to which the invention relates reference may be made to the remaining cited patents:

| U.S. Pat. No. | Issue Date | Patentee |
| --- | --- | --- |
| 2,480,247 | Aug. 30, 1949 | Jamison et al. |
| 4,098,577 | Jul. 4, 1978 | Halpern |
| 4,114,75 | Sep. 19, 1978 | Maloney, Jr. |
| 4,813,541 | Mar. 21, 1989 | Velasco et al. |
| 5,186,344 | Feb. 16, 1993 | Cook |
| 5,860,550 | Jan. 19, 1999 | Miller et al. |
| 6,112,579 | Sep. 5, 2000 | Tryba |

In making protective enclosure systems for open-ended tubes, a superior result may be achieved by using glass tubular members manufactured to highly precise specifications. While doing this enables the enclosure to be precisely manufactured to the specification of the tubular member and to thus achieve a packaging solution that includes little to no relative movement of the tubular member within the enclosure. For some implementations, the use of high precision incurs a cost that is higher than desired. This is in turn decreases a market acceptance of the solution.

Further, some applications may prefer different shapes of tubular members as compared to a glass tube with a flat circular bottom. For some applications or users, it may be preferable to provide a glass tube having a rounded arcuate bottom. For the level of protection afforded by products in this category, changing size, material, and/or shape of the tube significantly affects the enclosure. Thus a different arrangement for certain types of tubular members may be necessitated by changes in the tube, and vice-versa.

What is needed are alternatives to a successful protective assembly design set forth in incorporated U.S. Pat. No. 8,251, 221 including alternatives providing for a wider range of options that can have reduced associated manufacturing costs.

BRIEF SUMMARY OF THE INVENTION

Embodiments of the present invention provide a system and method are alternatives to a successful protective assembly design set forth in incorporated U.S. Pat. No. 8,251,221 including alternatives providing for a wider range of options that can have reduced associated manufacturing costs. The following summary of the invention is provided to facilitate an understanding of some of technical features related to an assembly for protecting a glass tubular container, and is not intended to be a full description of the present invention. A full appreciation of the various aspects of the invention can be gained by taking the entire specification, claims, drawings, and abstract as a whole. The present invention is applicable to other protective systems, as well as protecting other types of containers.

In accordance with one embodiment, a reusable protective enclosure system incorporates and protects an open-ended tubular glass member. The enclosure system comprises a protective housing, containing a bore of such diameter to receive the tubular glass member and a cap member, the cap member is securely attached over the opening of the protective housing. The cap member is secured to the protective enclosure by use of a plurality of magnets oriented circumferentially around the axis of the bore in both the protective housing and the cap member.

A reusable protective enclosure system in its basic design includes: a) a protective housing containing a bore of such diameter and depth as to receive the tubular glass member, a protective collar, and b) a cap member. The cap member incorporates a bore of such diameter to accommodate the protective collar that is incorporated into the protective housing top and the upper portion of the tubular glass member, and c) both the protective housing and the cap member, contain a plurality of permanently affixed magnets proximal to the openings of the bores in the cap member and protective housing, the magnets ensure that the contents of the tubular glass member are predictably enclosed within an airtight seal, and d) a means for protecting the tubular glass member from breakage via a shock absorber in the base of the protective housing and a pliable gasket embedded in the cap member.

A protective enclosure system for an open ended tubular member, includes A) a tubular member including a cavity, said tubular member having a first end, a second end opposite said first end, and an opening disposed in said first end accessing said cavity; B) a protective housing; 1) said protective housing including: a) a bore in said protective housing of such diameter and depth as to accommodate insertion of said tubular member, said bore including a first axis; b) a protective collar, said protective collar is incorporated into said protective housing at the opening of said bore in said protective housing; c) a shock absorber inserted into the bottom of said bore; said shock absorber providing a protective cushion upon which said tubular member rests when inserted into said bore; said shock absorber pivotally mounted within said bore; C) a cap member; 1) said cap member, including; a) a bore of such diameter to completely accommodate insertion of said protective collar protruding from said protective housing, and also encompassing said first end of said tubular member, said bore including a second axis; b) a gasket within said cap member; and c) means for securely coupling said cap member to said protective housing; whereby, when said cap member is coaxially placed over said protective housing by aligning said second axis with said first axis, a predictable airtight seal is obtained between said cap member and said protective housing; also said tubular member may be readily accessed, refilled and replaced by virtue of separating said cap member from said protective housing, thereby permitting direct access to said cavity of the tubular member or complete removal, sterilization and reuse or wholesale replacement of said tubular member; and wherein a tubular width of said tubular member is less than a bore width of said opening of said bore; and further comprising a compressible spacer having a compressed thickness equal to a difference between said bore width and said tubular width, said spacer positioned at said first end between an outer portion of said tubular member and an inner portion of said bore, an extended portion of said spacer extending beyond said first end with said extended portion having a thickness greater than said compressed thickness. Some implementations may include more than one spacer disposed in the space between the outer wall of the container and an inner surface of the bore. For example, two spacers may be distributed one hundred eighty degrees apart around the perimeter (in general, for a uniform distribution, each spacer of N number of spacers, N=0, 1, 2, 3, 4, 5, 6, or more, has an angular separation of 360/N (N greater than or equal to 1) degrees from the others). In other embodiments the spacers need not be uniformly distributed in this fashion. In these embodiments, appropriate space is collectively accounted for by the compressed thickness of the collective spacers.

A protective enclosure system of claim as described herein wherein said tubular member includes a perimeter wall defining said cavity between one or more lateral walls extending from said second end, wherein said second end includes a rounded bottom having an arcuate cross-section, and wherein said shock absorber including a rounded cup portion complementary to said arcuate cross-section and a body portion coupled to said rounded cup portion with said body portion inserted into said bottom of said bore.

A protective enclosure system for an open ended tubular member, includes A) a tubular member having a first end, a second end opposite said first end and including a perimeter wall defining a cavity between one or more lateral walls extending from said second end, said tubular member further including an opening disposed in said first end accessing said cavity, wherein said second end includes a rounded bottom having an arcuate cross-section; B) a protective housing including: a) a bore in said protective housing of such diameter and depth as to accommodate insertion of said tubular member, said bore including an opening, a bottom opposite of said opening, and a first axis; b) a protective collar, said protective collar incorporated into said protective housing at said opening of said bore in said protective housing with said protective collar including a protrusion extending away from said protective housing; c) a shock absorber coupled to said bottom of said bore; said shock absorber including a rounded cup portion complementary to said arcuate cross-section and a body portion coupled to said rounded cup portion, said shock absorber providing a protective cushion upon which said tubular member rests when said tubular member is inserted into said bore; and C) a cap member, including; a) a bore of such diameter to completely accommodate insertion of said protective collar and said protrusion, and also encompassing said first end of said tubular member, said bore including a second axis; b) a top seal within said cap member; and c) a closure system securely coupling said cap member to said protective housing, said closure system including a first set of closure elements coupled to said cap member and a second set of closure elements coupled to said protective housing, said first set of closure elements complementary to said second set of closure elements with said closure elements repeatably and selectively engageable and disengageble securing said cap member to said protective housing; and wherein, when said cap member is coaxially placed over said protective housing by aligning said second axis with said first axis and said first set of closure elements engages said second set of closure elements, said top seal produces a predictable airtight seal between said cap member and said protective housing.

A protective enclosure system of claim as described herein wherein a tubular width of said tubular member is less than a bore width of said opening of said bore; and further comprising a compressible spacer having a compressed thickness equal to a difference between said bore width and said tubular width, said spacer positioned at said first end between an outer portion of said tubular member and an inner portion of said bore, an extended portion of said spacer extending beyond said first end with said extended portion having a thickness greater than said compressed thickness.

A protective enclosure system as described herein wherein said first closure elements include continuous portions of a first helical structure disposed on an inside surface of said bore of said cap member, wherein said second closure elements include continuous portions of a second helical structure disposed on an outside surface of said protective housing, and wherein said helical structures are engaged when said top seal produces said predictable airtight seal.

A method of protecting a tubular member, includes a) inserting said tubular member into a bore of a protective housing, said a tubular member having a first end, a second end opposite said first end and including a perimeter wall defining a cavity between one or more lateral walls extending from said second end, said tubular member further including an opening disposed in said first end accessing said cavity, wherein said second end includes a rounded bottom having an arcuate cross-section and said protective housing including: a) said bore in said protective housing of such diameter and depth as to accommodate insertion of said tubular member, said bore including an opening, a bottom opposite of said opening, and a first axis; b) a protective collar, said protective collar incorporated into said protective housing at said opening of said bore in said protective housing with said protective collar including a protrusion extending away from said protective housing; and c) a shock absorber coupled to said bottom of said bore; said shock absorber including a rounded cup portion complementary to said arcuate cross-section and a body portion coupled to said rounded cup portion, said shock absorber providing a protective cushion upon which said tubular member rests when said tubular member is inserted into said bore; and b) supporting said tubular member in said bore using said shock absorber; and c) securing a cap member to said protective housing producing a predictable airtight seal between said cap member and said protective housing, said cap member including; a) a bore of such diameter to completely accommodate insertion of said protective collar and said protrusion, and also encompassing said first end of said tubular member, said bore including a second axis; b) a top seal within said cap member; and c) a closure system securely coupling said cap member to said protective housing, said closure system including a first set of closure elements coupled to said cap member and a second set of closure elements coupled to said protective housing, said first set of closure elements complementary to said second set of closure elements with said closure elements repeatably and selectively engageable and disengageble securing said cap member to said protective housing.

A method described herein wherein a tubular width of said tubular member is less than a bore width of said opening of said bore; further comprising: d) adding a compressible spacer into said opening of said bore before said step a), said compressible spacer having a compressed thickness equal to a difference between said bore width and said tubular width, said spacer positioned at said first end between an outer portion of said tubular member and an inner portion of said bore, an extended portion of said spacer extending beyond said first end with said extended portion having a thickness greater than said compressed thickness; wherein said inserting step a) compresses a portion of said compressible spacer positioned between said tubular member and said bore.

A preferred means for achieving the objects of this invention include a protective housing containing a bore of such diameter and depth as to accommodate insertion and storage of a tubular glass member. At the mouth of the bore is a protective collar that protrudes from the top of the protective housing. When the tubular glass member is fully inserted into the bore in the protective housing, the open-end of the tubular glass member is slightly exposed above the protective collar before the cap member is attached. At the base of the bore in the protective housing is a concentric but substantially smaller diameter cylindrical recess. Seated within this cylindrical recess is a shock absorber, which protects the tubular glass member from breakage should the protective housing, cap member and tubular glass member be subjected to a shock. In addition, the shock absorber is mounted within the cylindrical recess to allow the tubular glass member, which rests upon it, to easily twist around its vertical axis when the cap member is attached and detached from the protective housing. The shock absorber also exerts upward pressure against the tubular glass member bottom when the cap member is attached, thus rendering a predictable and airtight seal between the gasket in the cap member and the tubular glass member. The protective housing also contains at least one pair of circumferentially oriented cavities. Such cavities are positioned axially from the center of said bore and are proximal to the protective collar. Each cavity contains a permanently affixed magnet.

The protective enclosure system also includes cap member. The cap member incorporates a bore of such diameter as to accommodate the protective collar in the protective housing when the cap member is attached to the protective housing. At the closed-end of the bore in the cap member, is a replaceable rubber gasket, which is held in place due to the fact that its diameter is slightly larger than the diameter of the bore in which it sits. The rubber gasket ensures that the contents of the glass member are under a predictable airtight seal when the cap member and protective housing are attached to one another. The rubber gasket also provides a degree of shock absorption to protect the tubular glass member should the enclosure system suffer a fall or sudden jolt. The body of the cap member also contains at least one pair of circumferentially oriented cavities. Each cavity contains a permanently affixed magnet. Each magnet is positioned axially from the center of the bore in the cap member. Each magnet is proximal to the bore's opening in the cap member.

With this configuration, when the cap member is coaxially aligned over the protective housing, a magnetic attraction pulls the protective housing and cap member tightly and securely together. The magnetic force creates a predictable airtight seal wherein the protective collar in the protective housing and the slightly exposed portion of the tubular glass member are forced into the rubber gasket within the cap member and vice versa. Simultaneously, the shock absorber at base of the protective housing exerts an upward force against the closed-end of the tubular glass member further ensuring an airtight seal wherein the open-end of the tubular glass member is forced into the gasket in the cap member.

When desired, the cap member and the protective housing can be separated and the airtight seal easily broken. The cap and housing are separated by holding the protective housing in one hand, while radially twisting the cap member with the other hand. This twisting action distances the plurality of magnets in the protective housing from the magnets in the cap member, allowing the cap member to be easily lifted up and away from the protective housing. Once the cap member and protective housing are separated, the contents of the tubular glass member are readily accessible. Separation of the cap member from the protective housing also allows for easy removal of the tubular glass member from within the protective housing. Once the cap and protective housing have been separated the tubular glass member can be removed, washed, sterilized and entirely replaced and recycled.

It is therefore a broad object of this invention to provide an improved reusable protective enclosure system for a tubular glass member.

It is another object of this invention to provide such an improved enclosure system, which is easy to open and close, yet which is sure in long lasting, repeat operation.

In another aspect, it is an object of this invention to offer such an improved enclosure system, which provides accurate, repeatable and airtight enclosure characteristics including the achievement of predetermined compressive forces applied to seal a glass member.

In yet another aspect, it is an object of this invention to provide such an improved enclosure system, which protects a glass member from breakage, and which glass member can be readily removed from its protective enclosure for sterilization or replacement to enable its continued reuse or recycling.

In yet another aspect, it is an object of this invention to provide an improved enclosure system, which can be made in an easily portable format, such that it comfortably fits in a pocket, purse, briefcase or handbag.

These and other objects and advantages of the present invention will become apparent from the subsequent detailed description of the preferred embodiment and the appended claims taken in conjunction with the accompanying drawings.

Thus several advantages of one or more aspects of the reusable enclosure system for an open-ended tubular member are that it protects a tubular glass member from breakage when subjected to falls and abrupt shocks. Other advantages are that the glass member can be easily and repeated accessed and removed for sterilization, replacement and recycling. Furthermore, only the tubular glass member and the gasket within the cap member are intended to be replaceable, both the protective housing and cap member can be reused indefinitely thereby reducing cost and environmental waste.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 7 illustrates a side view of an alternate embodiment of the reusable protective enclosure system for an open-ended tubular member illustrated in FIG. 1-FIG. 6.

FIG. 8 illustrates a sectional view of the alternate embodiment illustrated in FIG. 7 along Section A-A.

FIG. 9 illustrates an exploded view of the alternate embodiment illustrated in FIG. 7.

FIG. 10 illustrates a side view of another alternate embodiment of the reusable protective enclosure systems for an open-ended tubular member illustrated in FIG. 1-FIG. 9.

FIG. 11 illustrates a sectional view of the alternate embodiment illustrated in FIG. 10 along Section B-B.

FIG. 12 illustrates an exploded view of the alternate embodiment illustrated in FIG. 10.

DETAILED DESCRIPTION OF THE INVENTION

Figure 1:
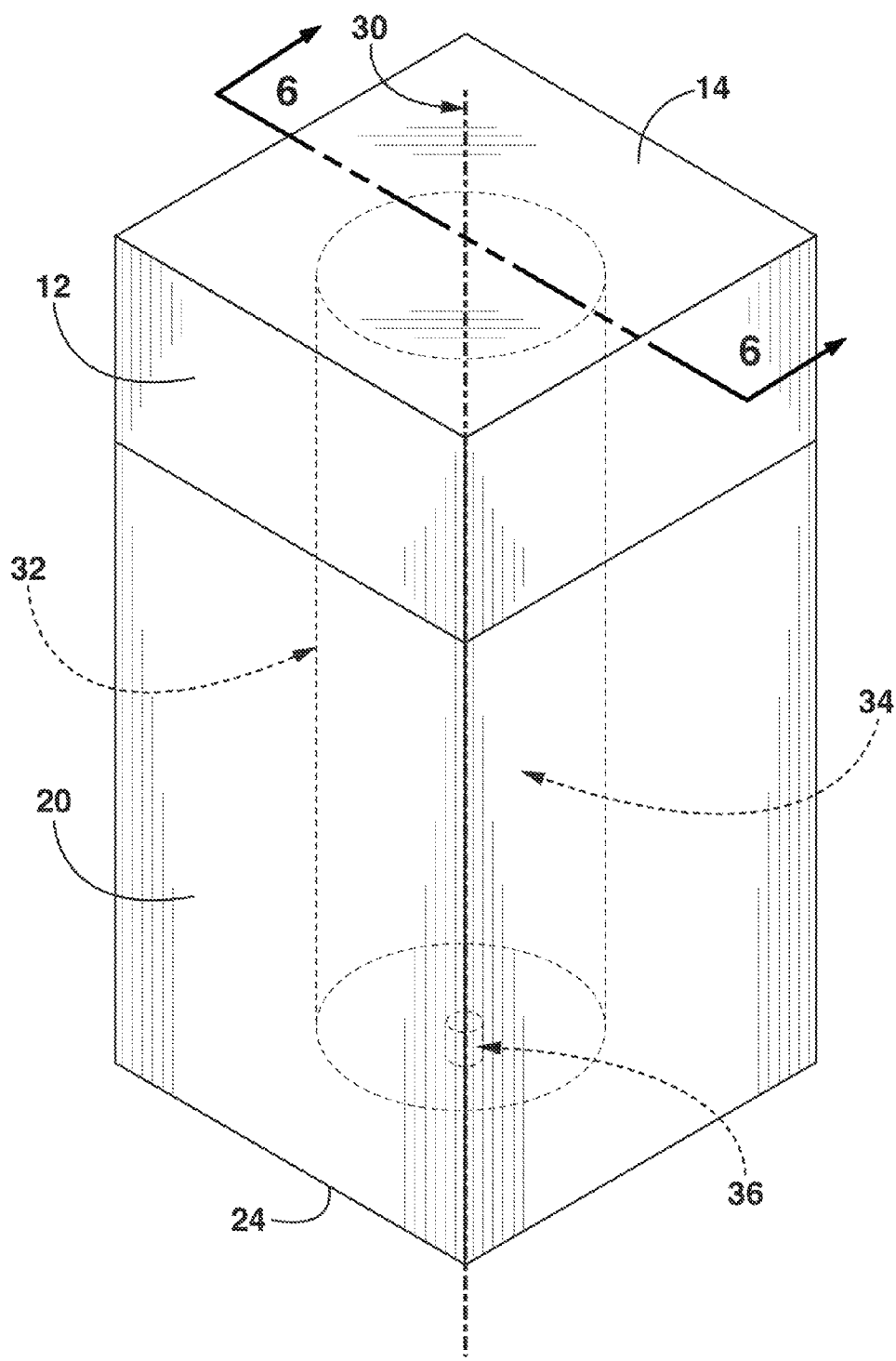
FIG. 1 illustrates a perspective view of the reusable protective enclosure system for an open-ended tubular member.

Embodiments of the present invention provide a system and method for are alternatives to a successful protective assembly design set forth in incorporated U.S. Pat. No. 8,251,221 including alternatives providing for a wider range of options that can have reduced associated manufacturing costs. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

DEFINITIONS

The following definitions apply to some of the aspects described with respect to some embodiments of the invention. These definitions may likewise be expanded upon herein.

As used herein, the term "or" is generally intended to mean "and/or" unless otherwise indicated.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "approximate" and "approximately" in the context of embodiments of the present invention includes a scope of statistical variation of a particular variable that the subsequently described event or circumstance may or may not occur, and for some implementations of the present invention corresponds to ±20% about the statistically prescribed value. Without context to the contrary, the use of the term "about" means approximately.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

FIG. 1-FIG. 6 illustrate an embodiment of the reusable protective enclosure system for an open-ended tubular member. FIG. 1 shows one embodiment of a reusable protective enclosure system for an open-ended tubular glass member. The reusable protective enclosure system incorporates a cap member 12. The cap member 12 has a bore 32 centered on an axis 30. The reusable protective enclosure system also incorporates a protective housing 20. The protective housing also incorporates a bore 32. The bore 32 in cap member 12 and the bore 32 in the protective housing 20 share a common axis 30 when attached to one another. The bore 32 in both the protective housing 20 and the cap member 12 together form a cavity 34 with a common axis 30. At the base of the bore 32 and proximal to the protective housing bottom 24 is a recess 36. The recess 36 is centered on axis 30. A sectional view of a reusable protective enclosure system for an open-ended tubular glass member is provided via FIG. 6.

Figure 2:
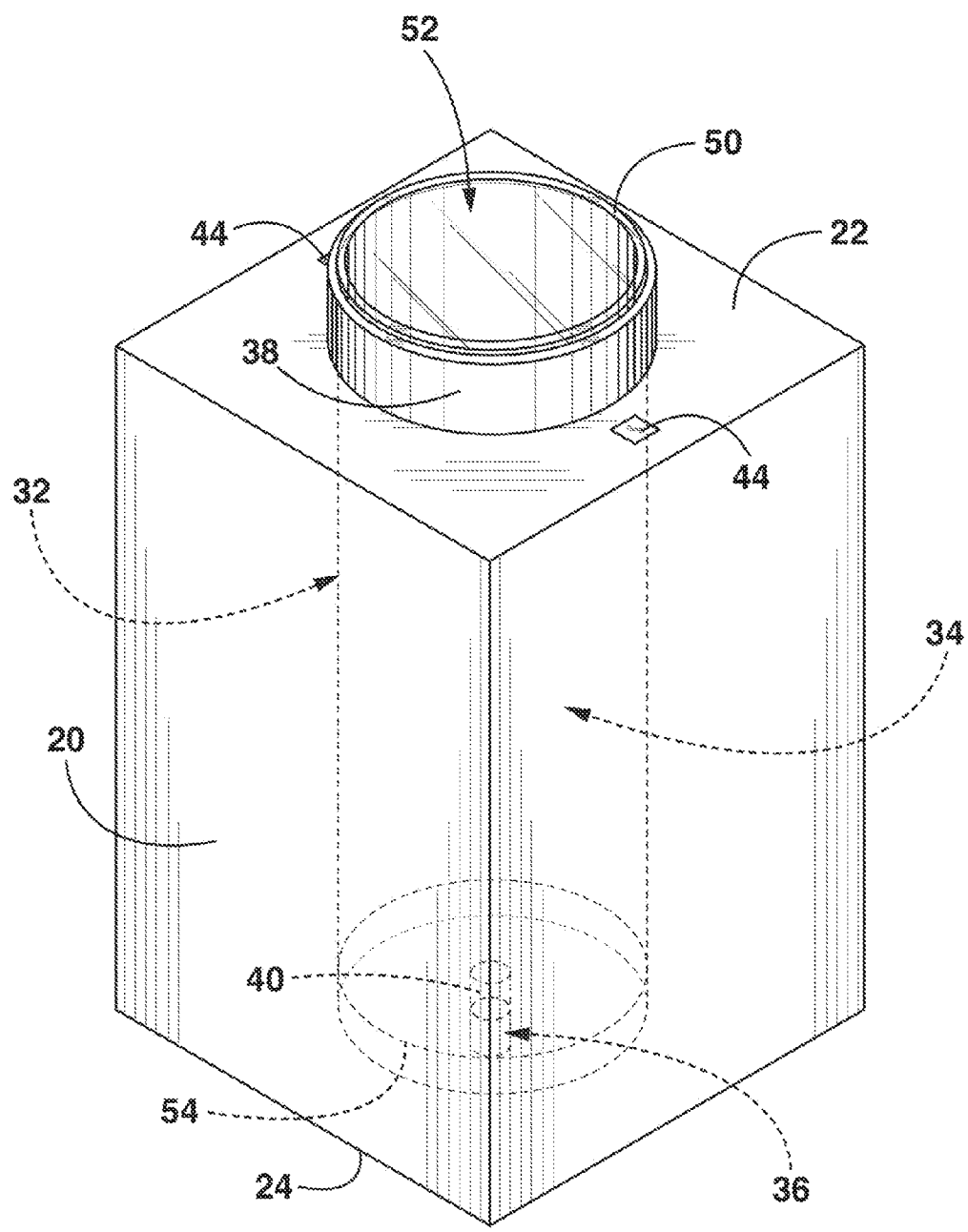
FIG. 2 illustrates a perspective view of the protective housing for a tubular glass member.

FIG. 2 is a perspective view of the protective housing for a tubular glass member. A tubular glass member 50 is seated within the cavity 34 created by the bore 32 in the protective housing 20. The tubular glass member open end 52 is exposed slightly above the protective collar 38. Two magnets 44 are positioned axially and permanently embedded in the protective housing top 22. The tubular glass member closed end 54 rests on a shock absorber 40. The shock absorber 40 sits within the recess 36 in the protective housing bottom 24.

Figure 3:
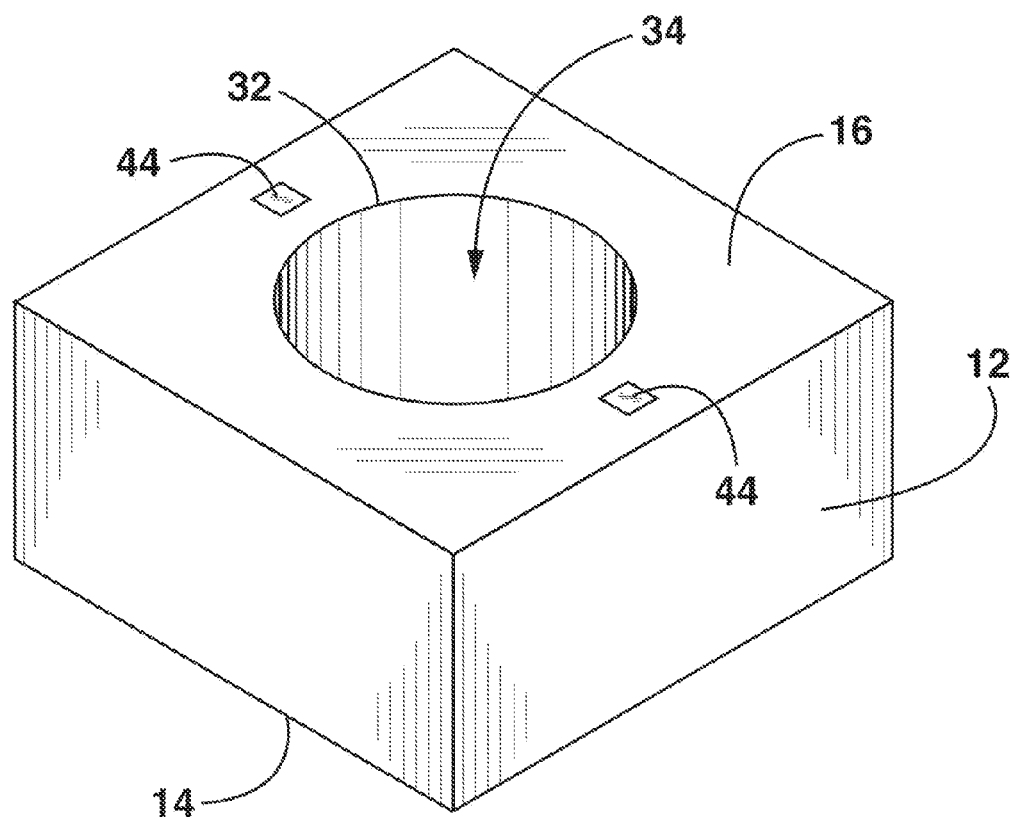
FIG. 3 illustrates a perspective view of the cap member.

FIG. 3 is a perspective view of the cap member 12. The cap member 12 incorporates a bore 32, which extends into the cap member 12. The bore 32 in the cap member 12 creates a cavity 34, which extends toward, but does not pass through the cap member top 14. Two magnets 44 are positioned axially from the center of the bore 32 in the cap member bottom 16.

Figure 4:
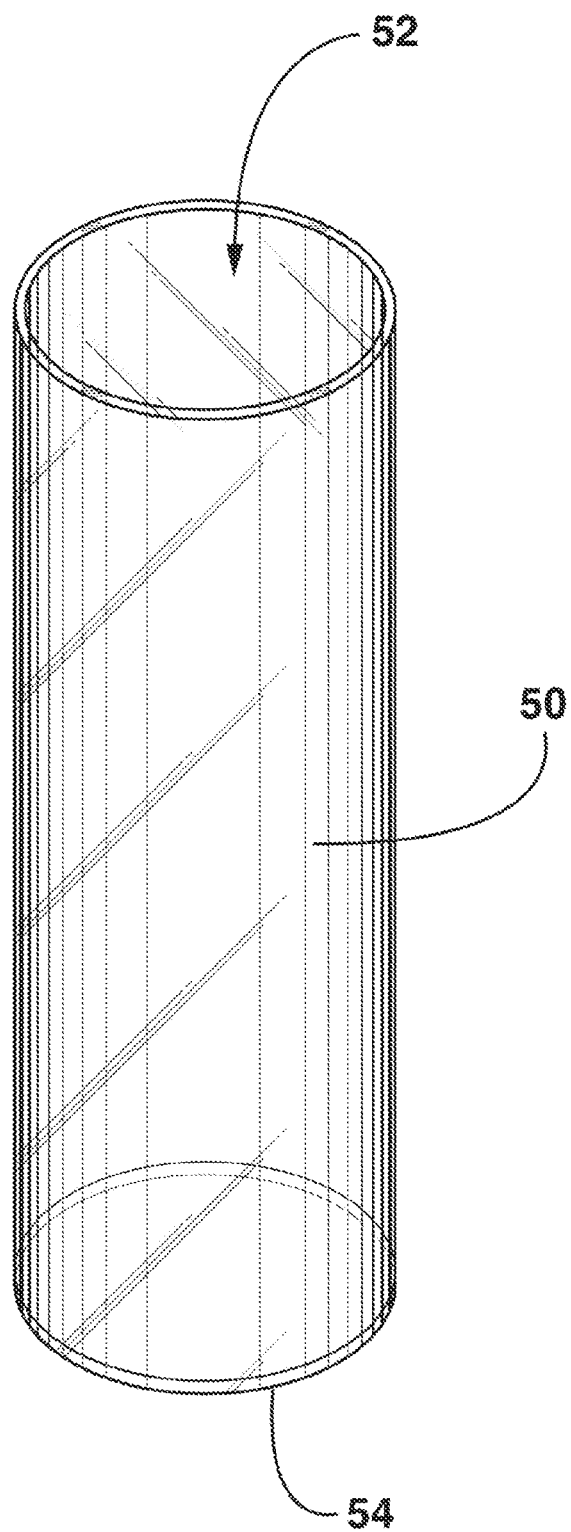
FIG. 4 illustrates a perspective view of the tubular glass member.

FIG. 4 is a perspective view of the tubular glass member 50. The tubular glass member 50 incorporates a tubular glass member open end 52 and a tubular glass member closed end 54.

Figure 5:
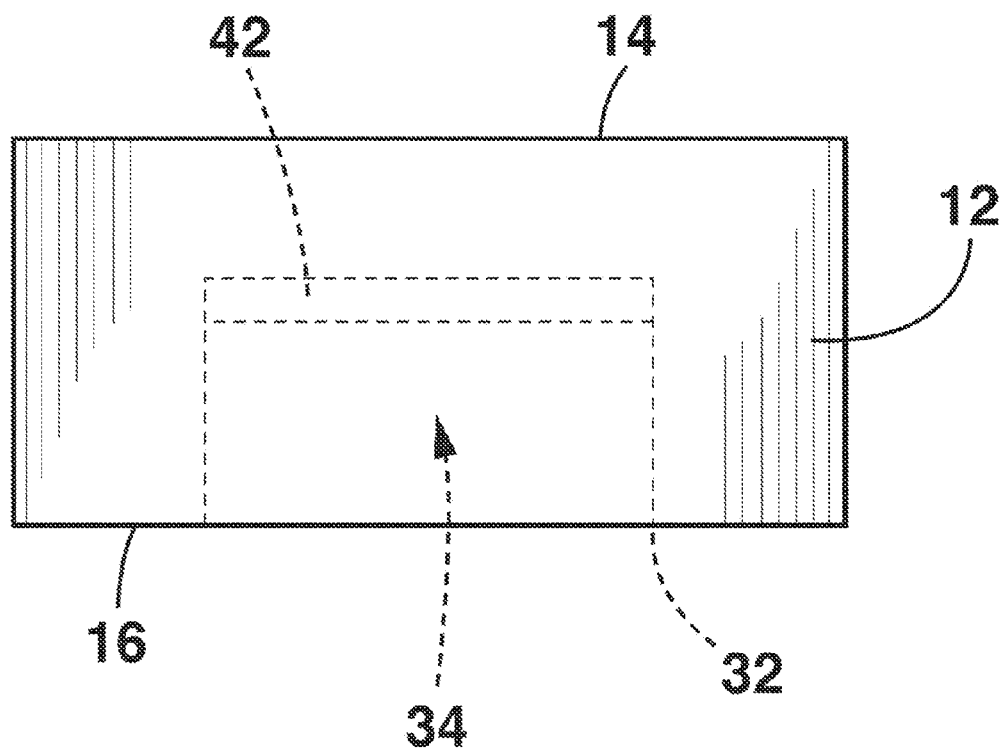
FIG. 5 illustrates a side view of a cap member.

FIG. 5 is a side view of the cap member 12. The cap member 12 incorporates a cap member top 14. A bore 32 with an opening at the cap member bottom 16 creates a cavity 34 that extends toward but does not pierce the cap member top 14. A gasket 42 rests within the bore 32 proximal to the cap member top 14.

Figure 6:
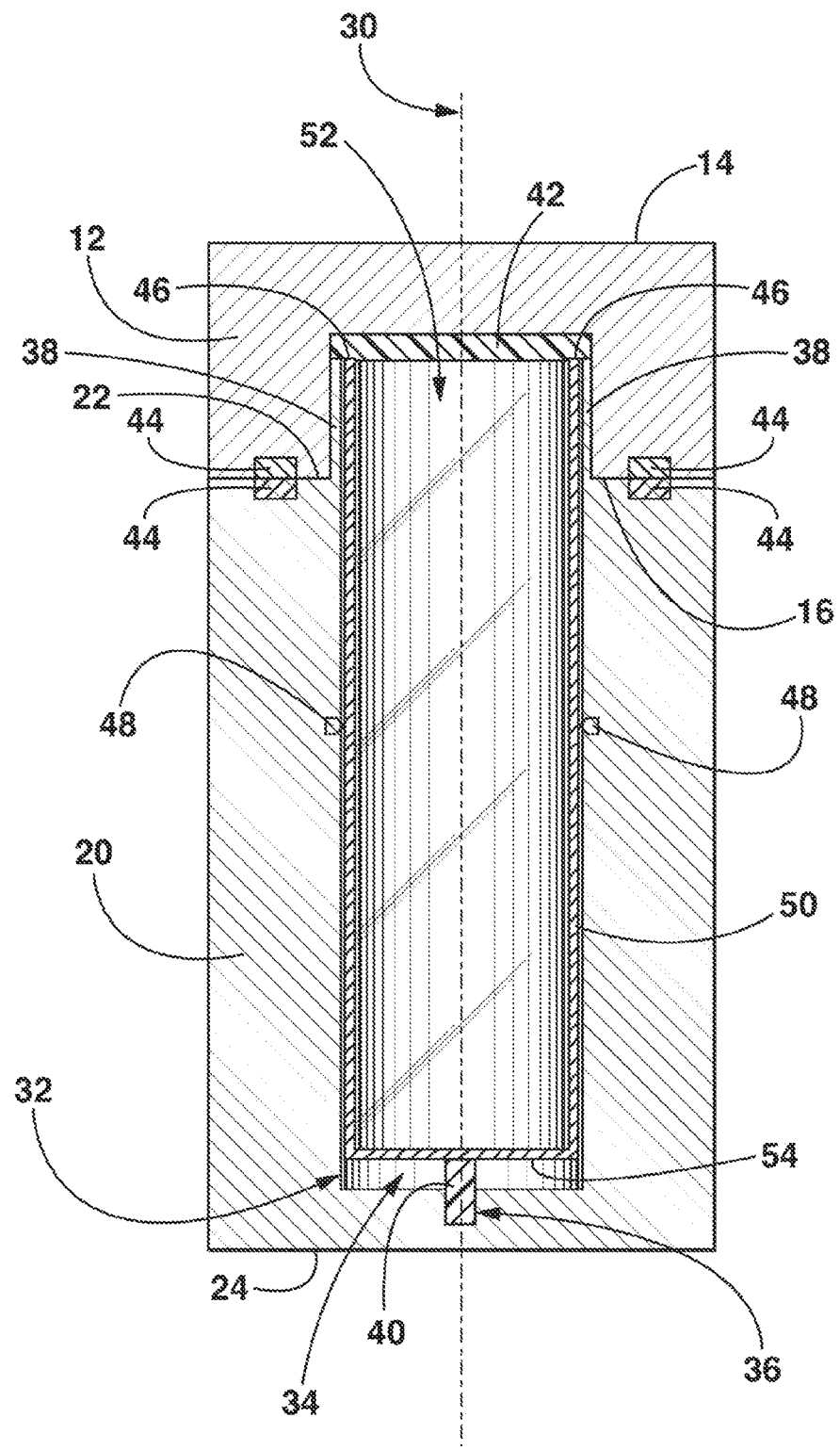
FIG. 6 illustrates a section view taken from FIG. 1.

FIG. 6 is a sectional view taken from FIG. 1. Proximal to the protective housing bottom 24 is a recess 36 into which is inserted a shock absorber 40. The tubular member closed end 54 rests upon the shock absorber 40. The tubular glass member 50 occupies the cavity 34 within the protective housing 20 and the cap member 12. Sidewall cushioning 48 is positioned circumferentially within the protective housing 20 adjacent to and contacting the tubular glass member 50. Magnets 44 are embedded equidistant and radially from axis 30 in the protective housing top 22 and the cap member bottom 16. A predictable airtight seal 46 is formed where the gasket 42, protective collar 38 and glass member open end 52 intersect and are forced into contact by the magnets 44 in the protective housing 20 and the cap member 12.

To store and protect contents, such as cosmetics, medicines, natural remedies and essential oils within an airtight seal, one must first place these materials within the tubular glass member 50 (FIG. 4). Such contents may be placed within the tubular glass member 50 (FIG. 4) while it is free standing or when it sits in the protective housing 20 (FIG. 2). To seal and protect said contents within the tubular glass member 50, the tubular glass member 50 is inserted in the cavity 34 within the protective housing 20 (FIG. 2). Next one aligns the cap member 12 (FIG. 3) with the cap member bottom 16 over the protective housing top 22 (FIG. 2). When properly oriented, such that the magnets 44 in the cap member bottom 16 (FIG. 3) and magnets in the protective housing top 22 (FIG. 2) face one another, magnetic attraction will force the cap member bottom 16 and the protective housing top 22 into one another. By virtue of the attractive force exerted by the magnets 44 in the cap member 12 and protective housing 20 an airtight seal 46 (FIG. 6) is formed where the tubular glass member open end 52 and protective collar 38 and the gasket 42 within the cap member 12 intersect (FIG. 6). This airtight seal 46 is augmented by the upward force created by the shock absorber 40 (FIG. 6) pushing against the tubular glass member closed end 54, thus maintaining pressure between the tubular glass member and the gasket 42 (FIG. 6).

To access the contents stored under airtight seal 46 within the tubular glass member 50, one must grip the protective housing 20 with one hand and then radially twists the cap member 12 with the other hand. This twisting motion causes the cap member 12 to twist radially around the protective collar 38 causing the magnets 44 in the cap member bottom 16 to be distanced from the magnets 44 in the protective housing top 22, thus breaking their attractive bond. Once the magnetic force is released the cap member 12 can be easily removed from the protective housing 20. With the cap member 12 (FIG. 3) and protective housing 20 (FIG. 2) separated, the contents of the tubular glass member 50 (FIG. 2) are readily accessible. Now the tubular glass member 50 (FIG. 4) can be removed from the protective housing 20 (FIG. 2) for sterilization or recycling. If desired the gasket 42 (FIG. 5) can also be removed or replaced as needed.

Thus, the advantages of the protective housing include storing cosmetics, medicines, natural remedies and essential oils within a portable glass lined container, protected from shock and under an airtight seal. In addition, the glass lined container can is easily removed for cleaning, sterilization or recycling.

Figure 7:
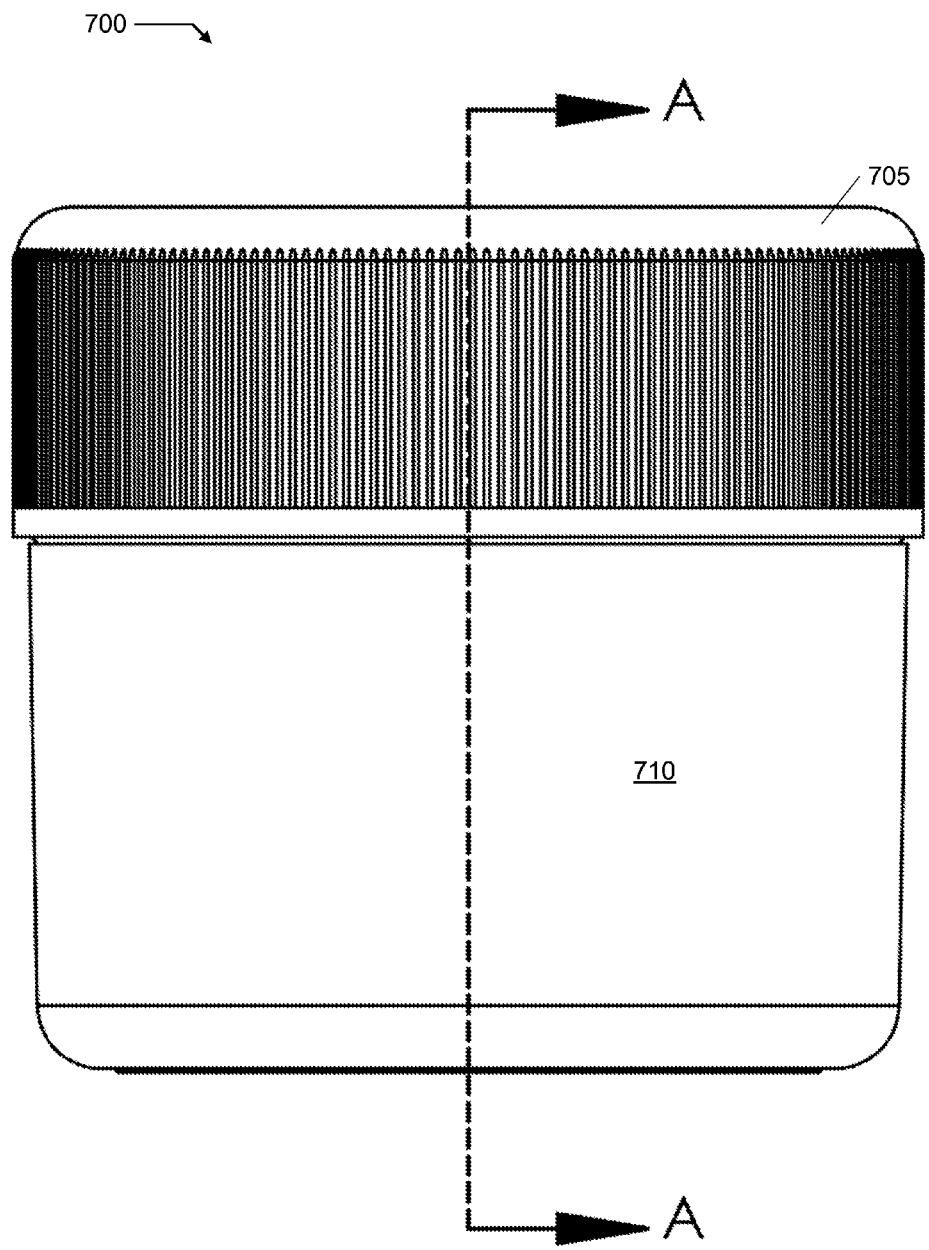
FIG. 7-FIG. 9 relate to an alternate embodiment of the reusable protective enclosure system for an open-ended tubular member illustrated in FIG. 1-FIG. 6.
Figure 8:
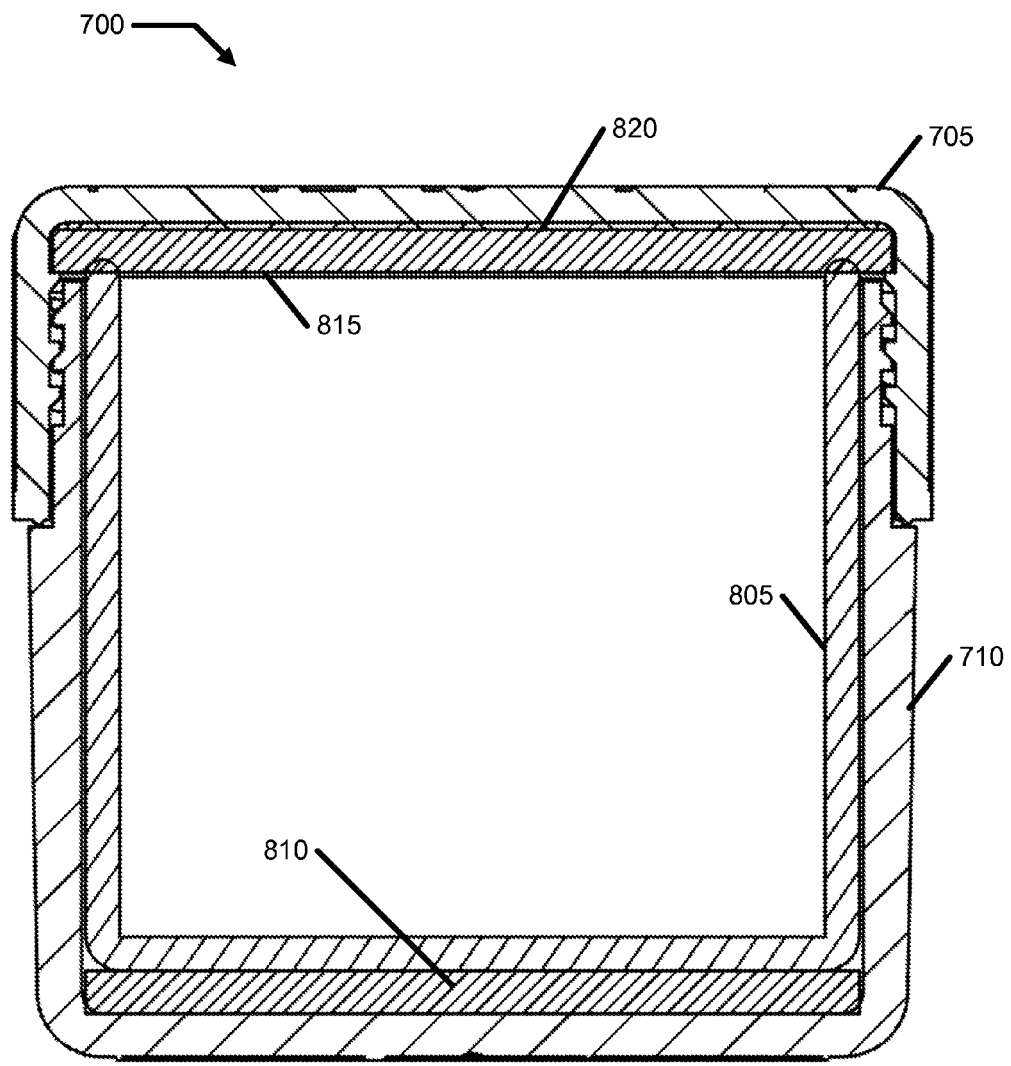
Figure 9:
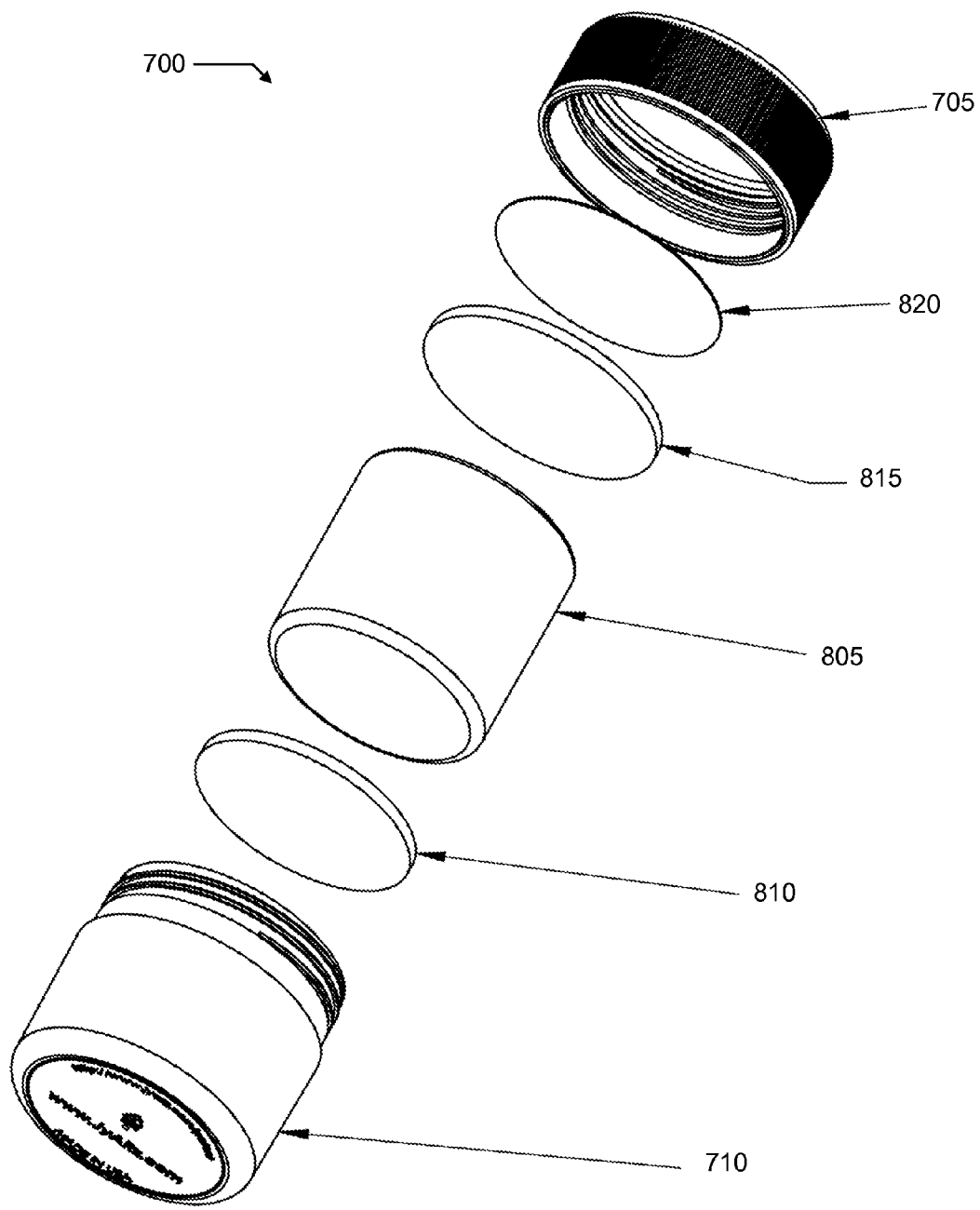

FIG. 7-FIG. 9 relate to an alternate embodiment of the reusable protective enclosure system 700 for an open-ended tubular member similar to member 50 referenced in FIG. 1-FIG. 6. FIG. 7 illustrates a side view of an alternate embodiment of the reusable protective enclosure system for an open-ended tubular member illustrated in FIG. 1-FIG. 6. FIG. 8 illustrates a sectional view of the alternate embodiment illustrated in FIG. 7 along Section A-A. FIG. 9 illustrates an exploded view of the alternate embodiment illustrated in FIG. 7. System 700 is similar to structure, arrangement, and operation as the system illustrated in FIG. 1-FIG. 6 with the exception that cap member 12 and housing 20 have a cylindrical cross-section as opposed to the square cross-section otherwise illustrated. System 700 includes a cap 705 and a protective housing 710 securing a jar 805. An elastomeric bottom seal 810 provides cushioning as described in the context of shock absorber 40. A cap assembly includes cap 705, a top seal 815, and a slip disc 820 between cap 705 and top seal 815. Top seal 815 closes off an opening of jar 805 to seal the opening closed and to secure contents of jar 805 inside. As illustrated, cap 705 and housing 710 are made of recycled high-density polyethylene (HDPE), jar 805 is made of glass, bottom seal 810 and top seal 815 are made of silicone rubber, and slip disc 820 is made of any of a variety of sturdy materials (e.g., polyethylene) that achieve the result of allowing cap 705 to rotate relative to top seal 815 (i.e., slip). This situation exists as cap 705 is secured using a rotational locking system (e.g., threads) to attach to housing 710. While rotating cap 705 onto housing 710, a bottom surface of top seal 815 engages and closes a perimeter of the opening of jar 805. Top seal 815 tends to become fixed relative to jar 805 while cap 705 rotates about aligned longitudinal axes of housing 710 and jar 805. Cap 705 preferably moves relative to a stop surface of top seal 815 which tends to try to rotate top seal 815 while the coupling of jar 805 to top seal 815 tends to resist rotation. Slip disc 820 is interposed to address this problem and provides a mechanism by which cap 705 can "slip" past top seal 815 during rotation. Slip disc 820 does not easily wear out and allows top seal 815 to rotate relative to cap 705.

Figure 10:
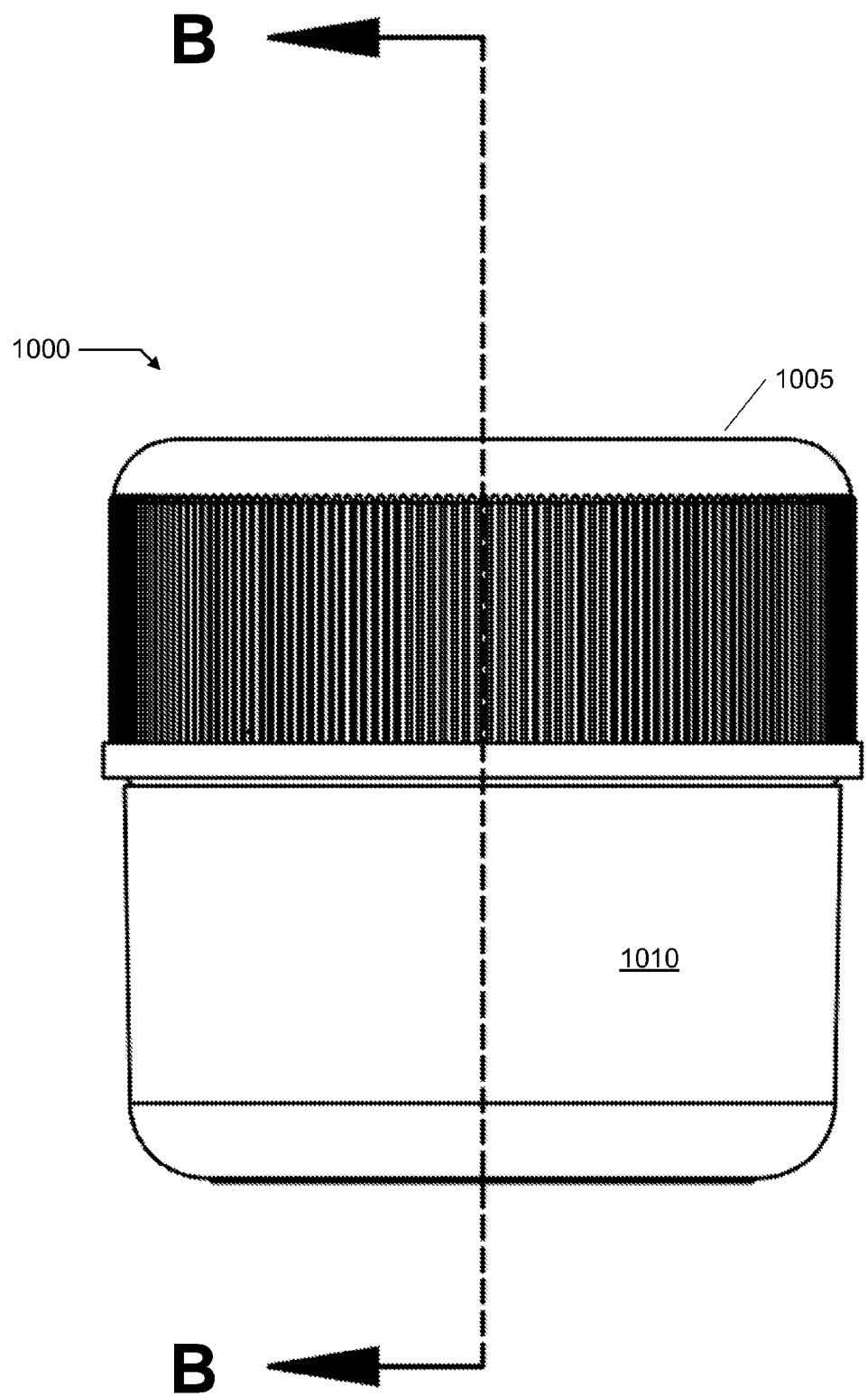
FIG. 10-FIG. 12 relate to an alternate embodiment of the reusable protective enclosure systems for an open-ended tubular member illustrated in FIG. 1-FIG. 9.
Figure 11:
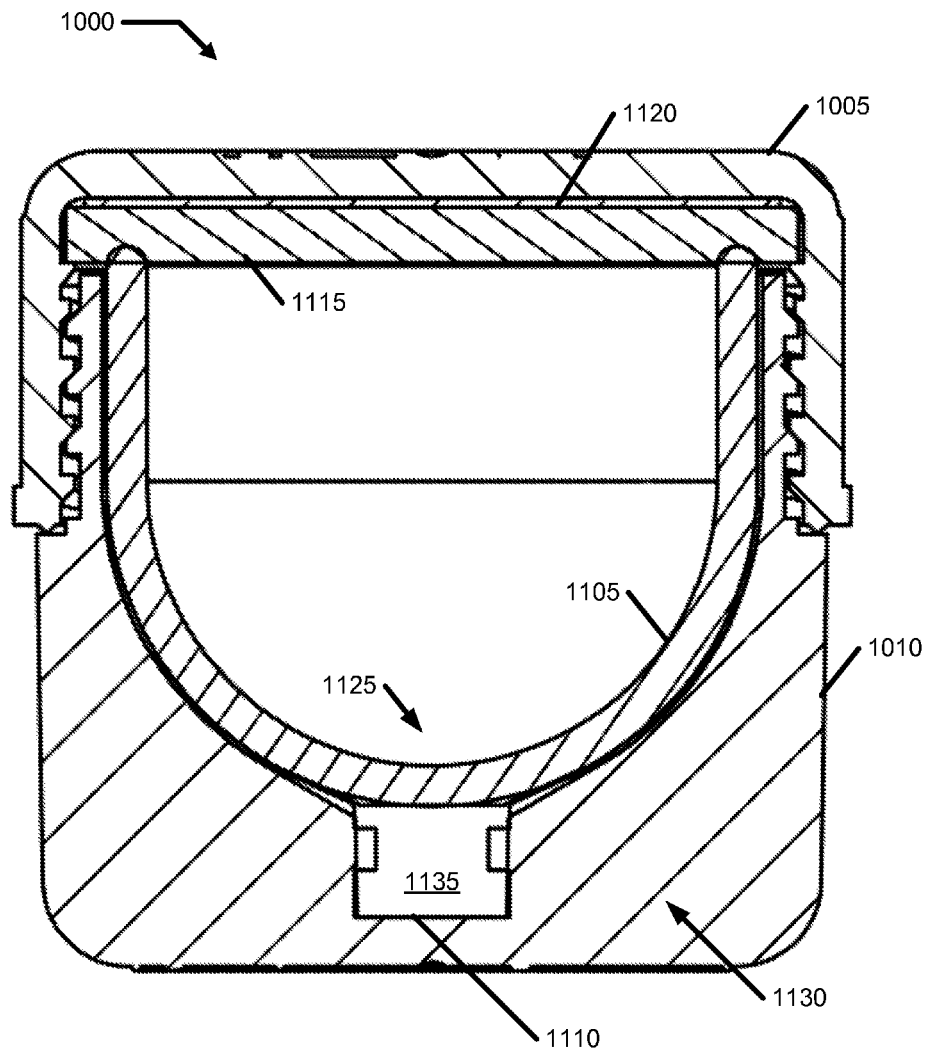
Figure 12:
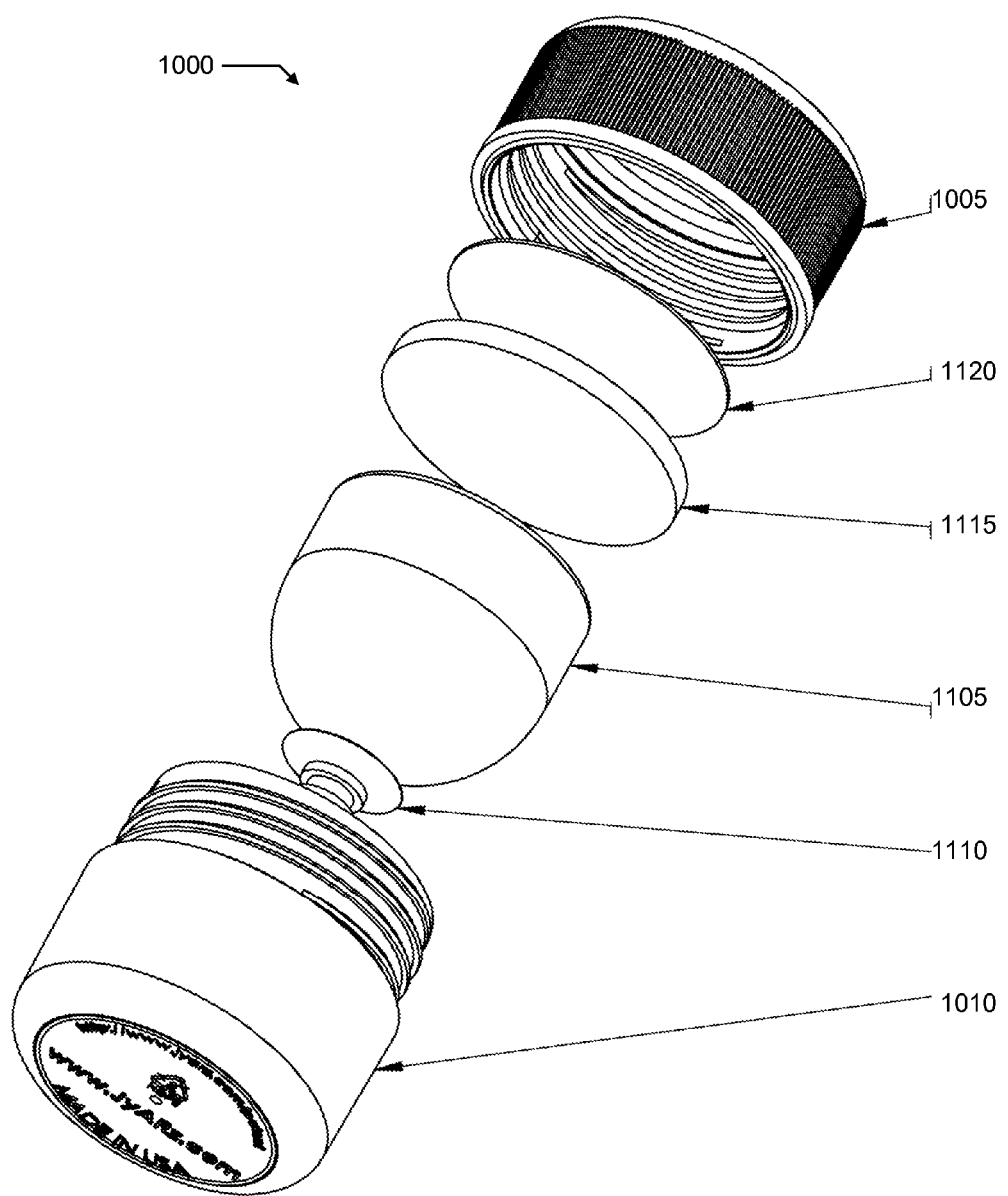

FIG. 10-FIG. 12 relate to an alternate embodiment of the reusable protective enclosure system 1000 for an open-ended tubular member 1105, sometimes alternatively referred to as a jar, container, and the like, similar to member 50 referenced in FIG. 1-FIG. 6 and jar 805 referenced in FIG. 7-FIG. 9 except that a bottom of member 1105 is rounded in contrast to a flat bottom of member 50 and jar 805. FIG. 10 illustrates a side view of another alternate embodiment of the reusable protective enclosure systems for an open-ended tubular member illustrated in FIG. 1-FIG. 9. FIG. 11 illustrates a sectional view of the alternate embodiment illustrated in FIG. 10 along Section B-B. FIG. 12 illustrates an exploded view of the alternate embodiment illustrated in FIG. 10. System 1100 is similar to structure, arrangement, and operation as the system illustrated in FIG. 1-FIG. 6 and system 700 illustrated in FIG. 7-FIG. 9, the housing and cap having a circular, square, or other cross-section, with the exception of the rounded bottom and implicated support structures. System 1000 includes a cap 1005 and a protective housing 1010 securing a jar 1105. An elastomeric conical bottom seal 1110 provides cushioning as described in the context of shock absorber 40 and bottom seal 810. A cap assembly includes cap 1005, a top seal 1115, and a slip disc 1120 between cap 1005 and top seal 1115. Top seal 1115 closes off an opening of jar 1105 to seal the opening closed and to secure contents of jar 1105 inside. As illustrated, cap 1005 and housing 1010 are made of recycled high-density polyethylene (HDPE), jar 1105 is made of glass, bottom seal 1110 and top seal 1115 are made of silicone rubber, and slip disc 1120 is made of any of a variety of sturdy materials (e.g., polyethylene) that achieve the result of allowing cap 1005 to rotate relative to top seal 1115 (i.e., slip) similarly as described in the context of FIG. 7-FIG. 9.

Bottom seal 1110 may, in some implementations, provide a suction-cup attachment portion coupled to a body portion: the suction-cup attachment portion engages and holds an outside bottom portion of rounded bottom 1125 of jar 1105 and supports it to suspend jar 1105 safely to cushion it. A bottom portion 1130 of housing 1010 is rounded closely complementary to rounded bottom 1115 to support portions of rounded bottom 1125 spaced away from a contact location where bottom seal 1110 makes physical contact. The body portion of bottom seal 1110 includes an extension 1135 mated into a complementary cavity of bottom portion 1130. In some implementations, extension 1135 is press-fit, contact-fit, screwed, inserted, or otherwise placed into bottom portion 1130 and held in place sufficiently that removal of jar 1105 from within housing 1010 does not also remove bottom seal 1110 from within housing 1010. Bottom seal 1110 varies as to materials used, size, and a coverage area of rounded bottom 1125 to achieve the desired level of jar-protecting force absorption.

Figure 13:
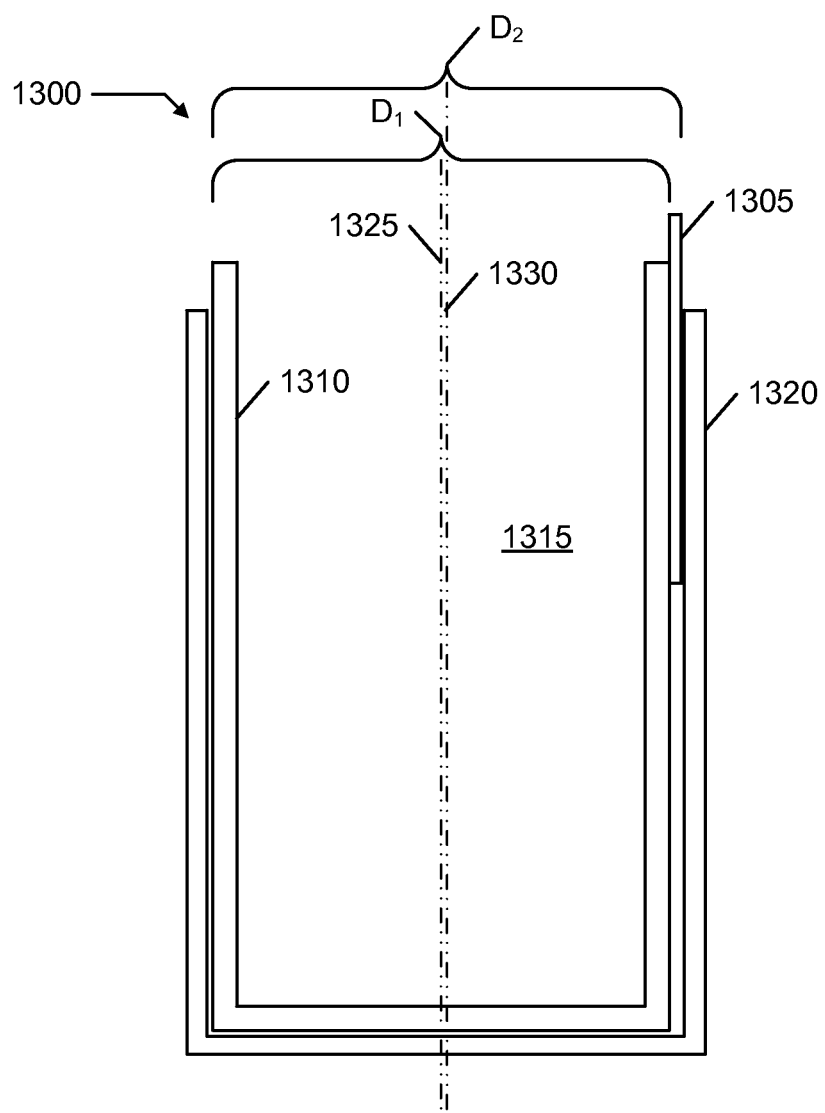
FIG. 13 illustrates a protective system 1300 using a spacer 1305.

FIG. 13 illustrates a protective system 1300 using a spacer 1305. Protective system 1300 may be incorporated into a variety of systems, including the designs, embodiments, and implementations described herein. One design that provides exceptional levels of protection that reduce risks of breaking a protected jar disposed in one of the protective systems is providing very close tolerances for an outside surface of the jar and an inside surface of the bore of the housing. There may be several reasons why this arrangement reduces the risks of breakage, including possibilities such as reducing motion of the jar inside the bore or increasing a frictional force between an outside surface of the wall of the jar and an inside surface of the bore of the housing which may not only reduces motion but provide axial damping.

It has been observed that implementations having looser tolerances have a greater risk of damage to the jar than those having tighter standards. However, making jars with highly precise dimensions and creating bores with dimensions closely matching those of the jars can greatly increase costs. Protective system 1300 provides improved protection while loosening manufacturing tolerances. Protective system 1300 does this by purposefully making an outer diameter $D_1$ of a jar 1310 smaller than an inner diameter $D_2$ of a bore 1315 of a housing 1320. This creates a greater than desired lateral space around an outside of the lateral wall(s) of jar 1310. Spacer 1305 is provided in this lateral space to secure jar 1310 within bore 1315. Spacer 1305 may be a simple removeable strip or other structure that is cloth, felt, elastomer, or other material interposed at a top opening of bore 1315 between housing 1320 and a top opening of jar 1310. Preferably spacer 1305 is mildly compressive and thicker than a difference $D_d$ between $D_2$ and $D_1$. In this context, mildly compressive refers to interstitial placement of a thicker-than-$D_d$ spacer 1305 without risk of breaking or cracking while also providing a desired level of lateral support.

One effect of this is to mis-align a longitudinal axis 1325 of jar 1310 from a longitudinal axis 1330 of bore 1315 (the misalignment arising from either lateral displacement of the jar relative to the bore, a tilting of the jar within the bore, or a combination of both depending upon an arrangement and orientation of the components). Spacer 1305 reduces a breakage risk associated with placing an intentionally reduced diameter jar 1310 inside bore 1315. FIG. 1-FIG. 6 also provide a spacer system that can be configured to achieve a similar function.

A reusable protective enclosure system for an open-ended tubular member may be made from a wide variety of materials. For example the protective housing and cap member could be formed from a variety of moldable polymerized compounds (e.g., plastic), metals, ceramics, glass, cellulose (e.g., wood, compressed paper, and the like), and rigid elastomers (e.g., natural or synthetic rubber) materials.

It is not always the case that the entire jar is made of glass. In some implementations, protective system may be used to protect an open-ended tubular member having multiple layers, such as an inner glass layer coated with a non-glass material, while other scenarios may employ some other materials which may not be glass. There is an advantage in embodiments of the present invention in protecting and securing containers made of amorphous solid material (e.g., glass), particularly in protecting and securing them during handling including transportation.

Reusable protective enclosure systems for an open-ended tubular member can be built in a wide range of sizes. The protective housing, cap member and tubular glass member could be formed to fit in a user's pocket to store and transport relatively small volumes of material. In addition, protective enclosure systems could be made for use in the home, in larger sizes, to accommodate much greater volumes of cosmetics, medications, natural remedies, tinctures and oils. Embodiments of the present invention are quite scalable between these various implementations and uses.

Reusable protective enclosure systems for an open-ended tubular member can be manufactured using a variety of methods. The protective housing, cap member could be fabricated using highly automated assembly processes in large volumes, via injection molding of plastic or automated milling of metallic or ceramic substances. Alternatively, the protective housing and cap member could be hand crafted by artisans with hand tools, thus creating highly decorative and unique and artistic forms in which the tubular glass member could be enclosed.

A reusable protective enclosure systems for an open-ended tubular member can be built in a wide range of configurations. For example the sidewalls of the bore in the protective housing and cap member could incorporate embedded cushioning for additional shock protection to protect the tubular glass member. One or more o-rings or gaskets, seated within channels cut into the protective housing and cap member could provide additional shock protection for the glass member. Or a plurality of soft protrusions inserted into the sidewalls of the rigid protective member and the cap member could also offer additional shock absorption. In addition, the glass member could be sheathed in a soft protective sleeve, both of which would be inserted within the protective housing. In situations where a dry substance is stored within the enclosure system, the glass member, and any other elements within the bore could be removed entirely, for a simplified yet airtight and effective enclosure. And, the recess and shock absorber in the base of the protective housing could be replaced by a conical or multi-wave spring, which would simply be inserted in the base of the bore within the protective housing. In addition the cap member and protective housing may be attached and an airtight seal formed within the tubular member by means of threads in the cap member and protective housing.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A protective enclosure system for an open ended tubular member, comprising:

A) a tubular member including a cavity, said tubular member having a first end, a second end opposite said first end, and an opening disposed in said first end accessing said cavity;

B) a protective housing;

1) said protective housing including:

a) a housing bore in said protective housing of such diameter and depth as to accommodate insertion of said tubular member through a housing bore opening, said housing bore including a first axis;

b) a protective collar, said protective collar is incorporated into said protective housing at said housing bore opening;

c) a shock absorber inserted into the bottom of said housing bore; said shock absorber providing a protective cushion upon which said tubular member rests when inserted into said housing bore; said shock absorber pivotally mounted within said housing bore;

C) a cap member;

1) said cap member, including;

a) a cap bore of such diameter to completely accommodate insertion of said protective collar protruding from said protective housing, and also encompassing said first end of said tubular member, said cap bore including a second axis;

b) a gasket within said cap member; and c) means for securely coupling said cap member to said protective housing;

whereby, when said cap member is coaxially placed over said protective housing by aligning said second axis with said first axis, a predictable airtight seal is obtained between said cap member and said protective housing; also said tubular member may be readily accessed, refilled and replaced by virtue of separating said cap member from said protective housing, thereby permitting direct access to said cavity of the tubular member or complete removal, sterilization and reuse or wholesale replacement of said tubular member; and wherein a tubular width of said tubular member is less than a bore width of said housing bore opening; and further comprising a compressible spacer having a compressed thickness equal to a difference between said bore width and said tubular width, said spacer positioned at said first end between an outer portion of said tubular member and an inner portion of said bore, an extended portion of said spacer extending beyond said first end with said extended portion having a thickness greater than said compressed thickness.

2. The protective enclosure system of claim 1 wherein said tubular member includes a perimeter wall defining said cavity between one or more lateral walls extending from said second end, wherein said second end includes a rounded bottom having an arcuate cross-section, and wherein said shock absorber including a rounded cup portion complementary to said arcuate cross-section and a body portion coupled to said rounded cup portion with said body portion inserted into said bottom of said housing bore.

3. A protective enclosure system for an open ended tubular member, comprising:

A) a tubular member having a first end, a second end opposite said first end and including a perimeter wall defining a cavity between one or more lateral walls extending from said second end, said tubular member further including an opening disposed in said first end accessing said cavity, wherein said second end includes a rounded bottom having an arcuate cross-section;

B) a protective housing including: a) a housing bore in said protective housing of such diameter and depth as to accommodate insertion of said tubular member, said housing bore including an opening, a bottom opposite of said opening, and a first axis; b) a protective collar, said protective collar incorporated into said protective housing at said opening of said housing bore in said protective housing with said protective collar including a protrusion extending away from said protective housing; c) a shock absorber coupled to said bottom of said housing bore; said shock absorber including a rounded cup portion complementary to said arcuate cross-section and a body portion coupled to said rounded cup portion, said shock absorber providing a protective cushion upon which said tubular member rests when said tubular member is inserted into said housing bore; and C) a cap member, including; a) a cap bore of such diameter to completely accommodate insertion of said protective collar and said protrusion, and also encompassing said first end of said tubular member, said cap bore including a second axis; b) a top seal within said cap member; and c) a closure system securely coupling said cap member to said protective housing, said closure system including a first set of closure elements coupled to said cap member and a second set of closure elements coupled to said protective housing, said first set of closure elements complementary to said second set of closure elements with said closure elements repeatably and selectively engageable and disengageable securing said cap member to said protective housing; and wherein, when said cap member is coaxially placed over said protective housing by aligning said second axis with said first axis and said first set of closure elements engages said second set of closure elements, said top seal produces a predictable airtight seal between said cap member and said protective housing;

wherein a tubular width of said tubular member is less than a bore width of said opening of said housing bore;

and further comprising a compressible spacer having a compressed thickness equal to a difference between said bore width and said tubular width, said spacer positioned at said first end between an outer portion of said tubular member and an inner portion of said housing bore, an extended portion of said spacer extending beyond said first end with said extended portion having a thickness greater than said compressed thickness.

4. A method of protecting a tubular member, comprising:

a) inserting said tubular member into a bore of a protective housing as an inserting step a), said tubular member having a first end, a second end opposite said first end and including a perimeter wall defining a cavity between one or more lateral walls extending from said second end, said tubular member further including an opening disposed in said first end accessing said cavity, wherein said second end includes a rounded bottom having an arcuate cross-section and said protective housing including: a) said bore in said protective housing of such diameter and depth as to accommodate insertion of said tubular member, said bore including an opening, a bottom opposite of said opening, and a first axis; b) a protective collar, said protective collar incorporated into said protective housing at said opening of said bore in said protective housing with said protective collar including a protrusion extending away from said protective housing; and c) a shock absorber coupled to said bottom of said bore; said shock absorber including a rounded cup portion complementary to said arcuate cross-section and a body portion coupled to said rounded cup portion, said shock absorber providing a protective cushion upon which said tubular member rests when said tubular member is inserted into said bore; and b) supporting said tubular member in said bore using said shock absorber; and c) securing a cap member to said protective housing producing a predictable airtight seal between said cap member and said protective housing, said cap member including; a) a bore of such diameter to completely accommodate insertion of said protective collar and said protrusion, and also encompassing said first end of said tubular member, said bore including a second axis; b) a top seal within said cap member; and c) a closure system securely coupling said cap member to said protective housing, said closure system including a first set of closure elements coupled to said cap member and a second set of closure elements coupled to said protective housing, said first set of closure elements complementary to said second set of closure elements with said closure elements repeatably and selectively engageable and disengageble securing said cap member to said protective housing;

wherein a tubular width of said tubular member is less than a bore width of said opening of said bore;

further comprising:

d) adding a compressible spacer into said opening of said bore before inserting said tubular member into said bore of said protective housing, said compressible spacer having a compressed thickness equal to a difference between said bore width and said tubular width, said spacer positioned at said first end between an outer portion of said tubular member and an inner portion of said bore, an extended portion of said spacer extending beyond said first end with said extended portion having a thickness greater than said compressed thickness;

wherein said inserting step a) includes compressing a portion of said compressible spacer positioned between said tubular member and said bore of said protective housing.

* * * * *